June 4, 1968  KUNITOSHI TEZUKA  3,386,374
SCRAP-METAL COMPRESSOR

Filed Sept. 2, 1966  3 Sheets-Sheet 1

INVENTOR.
KUNITOSHI TEZUKA
BY
AGENT

INVENTOR.
KUNITOSHI TEZUKA

AGENT

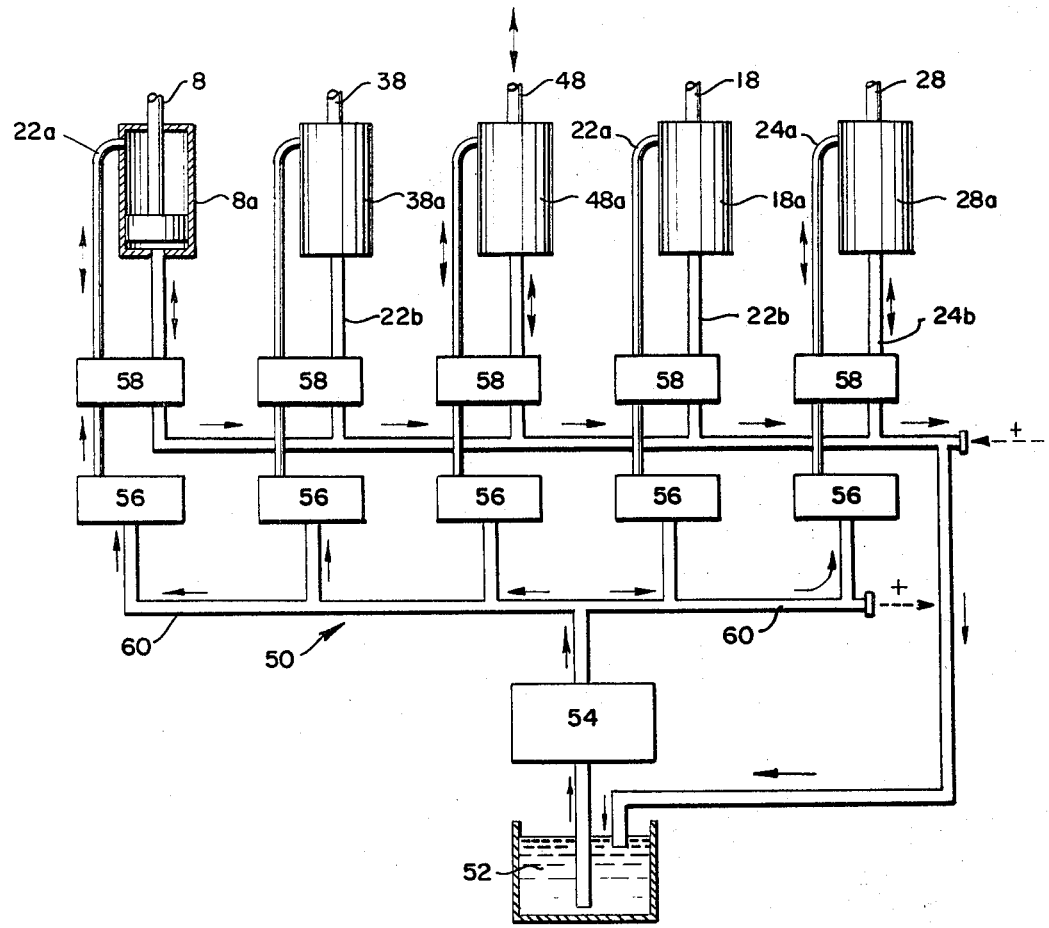

United States Patent Office 3,386,374
Patented June 4, 1968

3,386,374
SCRAP-METAL COMPRESSOR
Kunitoshi Tezuka, 34 7-chome, Minamisuna-machi,
Koto-ku, Tokyo, Japan
Filed Sept. 2, 1966, Ser. No. 576,915
13 Claims. (Cl. 100—215)

ABSTRACT OF THE DISCLOSURE

Scrap-metal compressor for forming into blocks various iron and metal materials to be reprocessed in a furnace, with a compressor casing into which the materials are introduced, a pressure plate slidable in the casing, a pressure receiver removably attached to one end of the casing, and at least one ram and cylinder assembly, traversing the pressure receiver, and energizable for applying a compressive force to the materials for compacting the same into said blocks.

---

The present invention relates to a scrap-metal compressor for forming into blocks of desired shape scraps of any kinds of metal, suitable to be introduced into a melting furnace for reprocessing.

Heretofore, the conventional devices for compressing scraps of metal, especially, iron articles, into blocks of a predetermined shape, compact or compress the scrap lumps thrown into the compression casing of the devices with a force plate driven by known drive means, such as oil-pressure cylinders, or they use mechanical impact applied to the scrap lumps. Such conventional devices, however, require drive means capable of delivering a powerful compression force, necessitating that the device itself be of large size, requiring a substantial amount of material for its manufacture. The compression casing, in particular, as well as other parts, must be constructed so as to be strong enough to resist the powerful compression force.

In addition, the scraps of a variety of metal articles necessarily include those having varying shapes, sizes and thicknesses, and therefore, even though some scrap lumps can be compactly processed when subjected to the compressing action of said force plate, other lumps will still remain in a coarse, partly non-compressed condition. Consequently it is impossible to form the scrap lumps into well compressed blocks with the known devices. When melting scraps in electric furnaces, several pieces of such scrap-metal blocks are added with each melting so as to obtain the required amount of molten metal.

It is one of the principal objects of the present invention to provide a scrap-metal compressor which is capable to compress scrap lumps of any possible shape or size into compact blocks of a desired, predetermined shape, by effectively and economically exploiting the available compression force.

Another object of the invention is to provide a compressor which is capable to compress as well as to mix the scrap lumps, thereby forming them into extremely compact blocks of desired shape.

Yet another object of the invention relates to the provision of such a compressor which is capable to introduce scrap lumps successively into the compression casing, at every individual compressing action, so as to afford a substantial amount of scraps compressed or molded into a single block.

The subject matter of the present invention is closely related to applicant's co-pending patent applications, filed on even date with the present case, entitled "Device for Removing Materials from a Compressor," Ser. No. 576,-916, "Scrap-Metal Compressor," Ser. No. 576,917, "Rotary Scrap-Metal Compressor," Ser. No. 576,918, and "Hoisting Sling Having Fusible Connection and Method for Charging Materials into a Furnace," Ser. No. 576,919. With a view to avoiding details in each of these applications which are only of secondary importance, it should be understood that the disclosures of the simultaneously filed applications are to be considered as complementing each other, where necessary.

According to important features of the present invention, the scrap-metal compressor comprises a compression casing for receiving the scrap lumps, a pressure plate reciprocable within said casing on the effect of appropriate drive means, a pressure receiver mounted on the end of the casing opposite to that where the pressure plate is inserted, and a plurality of spot pressure rams arranged on the pressure receiver, reciprocable in said casing in a direction opposite to the movement of said pressure plate.

In the compressor according to the invention, the scrap lumps thrown into the casing are first subjected to a compression similar to that performed in conventional devices by actuating the pressure plate, whereupon they are compacted or molded into blocks still including coarse and dense portions; thenceforth, they will undergo a concentrated compression at points adjacent the lower or active ends of the spot pressure rams. Thus the coarse portions of the partly compressed blocks are compactly compressed while the densely compressed portions will remain substantially unchanged so that the compressed, internal structure of the blocks is rendered homogeneous. This results in a condition on the surface of the compacted blocks that the portions that have undergone the spot compression are somewhat concave and the portions that have not undergone such a spot compression by the rams are somewhat convex in shape.

Subsequently each spot pressure ram is made to recede while the pressure plate is again advanced; the blocks having the afore-mentioned concave and convex portions will thus suffer a concentrated compression at each convex portion so that the latter will be further compressed, to be substantially leveled off, while also the interior of the blocks is further compressed to be nearly uniformly compact, thus resulting in the formation of scrap-metal blocks of the desired shape and consistency.

The inventive compressor thus yields blocks with a predetermined weight and shape, suitable to be charged in an efficient and economical way into electrical and other furnaces. The so obtained blocks need be introduced only by themselves, without repeated charging of two or more such blocks for one melting operation.

The present invention will be better understood, and additional advantages thereof will become more apparent, upon perusal of the following description of an exemplary, preferred embodiment thereof, taken in conjunction with the appended drawings, wherein FIG. 1 is a vertical, sectional, frontal view of the scrap-metal compressor according to the invention;

FIG. 4 is a schematic illustration of an actuating system for the rams and cylinders of the scrap-metal compressor.

Figure 1:
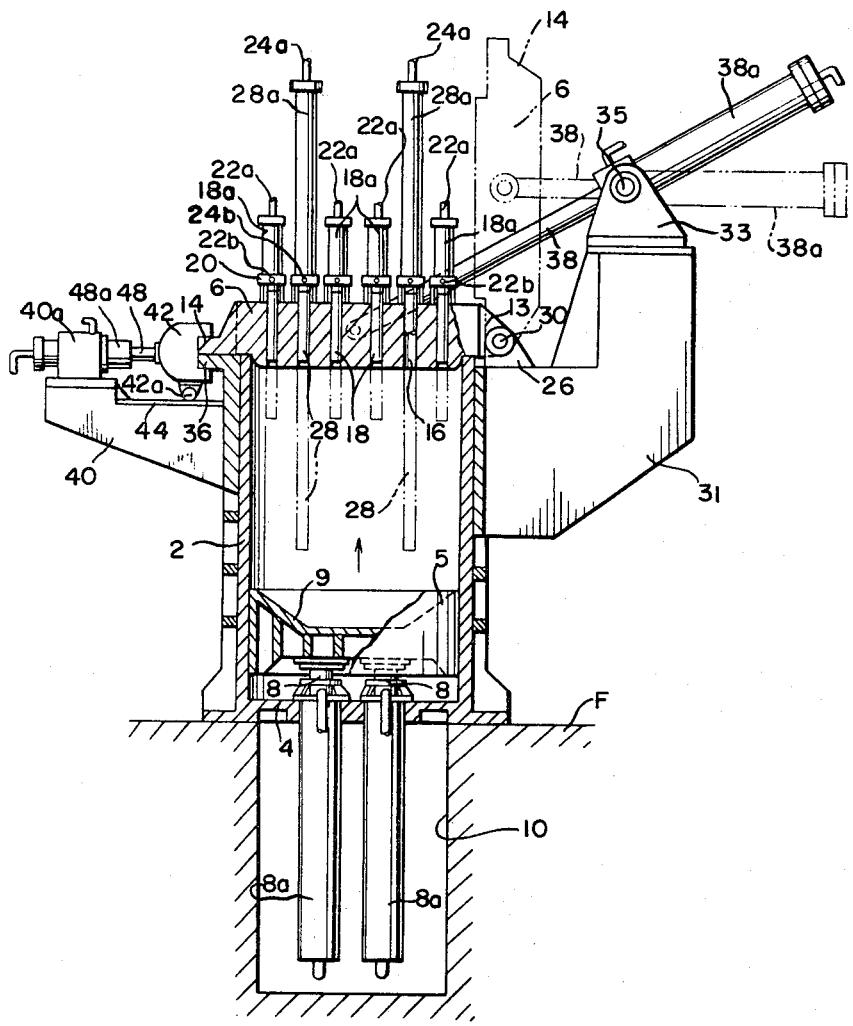

Before proceeding with the detailed description of the inventive device, it should be noted that identical *even* reference numerals have been used in the present application with corresponding structural elements of the above-mentioned application Ser. No. 576,916, entitled "Device for Removing Materials from a Compressor," while in each application, *odd* reference numerals denote dissimilar elements. Owing to the close correlation of the respective subject matter, this will facilitate the understanding of the disclosures.

The compressor includes a compressor casing 2 having a bottom plate 4 which is substantially cylindrical and rests in upright position on the floor F. Within said casing 2 there is slidably inserted a disk-shaped pressure plate 5, and on the open upper end there is mounted a pressure receiver or end plate 6 which can be opened and closed, and locked, as will be explained somewhat later.

The pressure plate 5 is connected with the upper end of rams 8 of two hydraulic cylinders 8a which are supported in vertical position by the bottom plate 4 of the casing, the presure plate 5 being vertically reciprocable inside the casing 2 by introducing and respectively discharging hydraulic fluid into and from the cylinders 8a. The upper face of the pressure plate is formed with a concave recess 9, corresponding in shape to the interior of a melting furnace. A cylinder chamber 10 is arranged in pit form underneath the compressor, in floor F, just below the bottom plate 4 of the casing, for accommodating the downwardly directed cylinders 8a.

Figure 3:
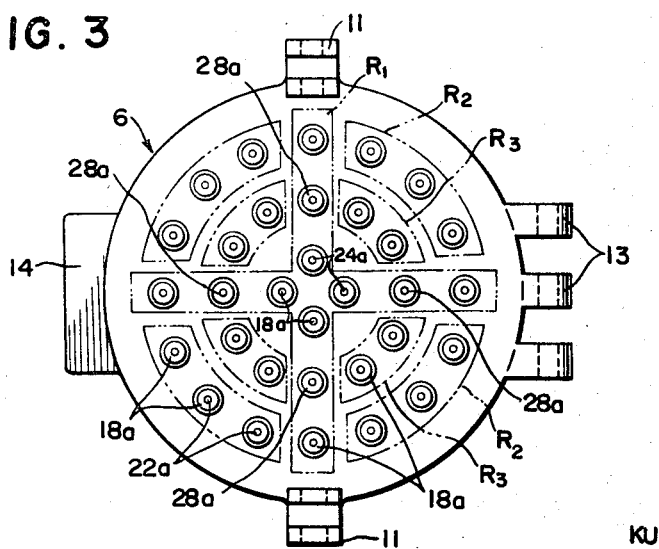
FIG. 3 is a somewhat enlarged top plan view of the pressure receiver or end plate of the compresor.

The pressure receiver 6 is substantially disk-shaped, as shown in FIG. 3, and has lateral brackets 11 (not visible in FIG. 1) disposed diametrally on opposite sides of the receiver. Along a perpendicular diameter, there are opposedly arranged a number of hinges 13 and a flange 14, which engage structural elements of the casing 2 as will be explained later.

The pressure receiver 6 has a plurality of ram holes 16 (see FIG. 1) at substantially equal intervals. As a matter of example, 32 holes have been shown but it will be understood that there may be more or less, according to prevailing requirements. These holes 16 traverse the disk-shaped receiver 6, and on the upper face of the receiver, there are spot-pressure rams 18 with associated hydraulic cylinders 18a, held by respective supporting means 20 in positions corresponding to each of the holes 16. Some of the rams and cylinders (for example four) are identified with numerals 28 and 28a, respectively, and they have a relatively long ram stroke, as will be clear from FIG. 1.

The rams 18, 28 are inserted into the holes 16 of the pressure receiver 6; when receding, the lower ends of the rams are located at the same level as the lower face of the receiver 6; when advanced by action of the hydraulic fluid within the cylinders, the rams will protrude by a proper distance into the compression casing 2, below the lower face of the receiver 6, as shown for rams 28 in dot-dash lines in FIG. 1. The front ends of the rams will thus approach the recess 9 of the pressure plate 5 when located in its retracted position shown in FIG. 1. FIG. 3 shows the preferred location of the long-stroke ram cylinders 28a with respect to the others, identified by numerals 18a.

The regular-stroke rams 18 and their cylinders 18a are divided into several groups. As shown in FIG. 3, and as a matter of example, there is a primary spot-pressure ram group $R_1$; from among the other groups, the one located on the outermost circumference of the receiver 6 is a secondary ram group $R_2$, and the one located more inwardly is the tertiary ram group $R_3$.

Feed pipes 22a are connected with each ram cylinder 18a in said group $R_1$, while pipes 22b constitute discharge conduits for the same.

FIG. 4 shows, in a somewhat schematic manner, an actuating system or mechanism generally designated by numeral 50, for the rams and cylinders of the compressor. In a conventionally known manner, the afore-mentioned feed pipes 22a, 22b are connected in the system 50 to a source of hydraulic fluid, for example an oil tank 52. A conventional hydraulic pump 54 may convey the fluid to said feed pipes over appropriate valves 56 and change-over switches 58. A pressurized fluid tank (not shown) may be provided on the discharge side of the pump 54 which branches off to the feed pipes by way of a single fed pipe 60 by the intermediatory of the valves 56. The discharge pipes lead back to the tank 52 either directly, as shown, or by way of the same valves (not shown).

Owing to this arrangement, each ram may be moved back and forth (that is, up and down, as viewed in FIG. 1), synchronously or separately.

A similar arrangement of feed and discharge pipes 22a, 22b is provided for the ram cylinders of group $R_2$, leading to the same or to another power source, like the oil tank 52, arranged so that these rams may be operated separately from those of group $R_1$. This operation is preferably also synchronous within the group.

Finally, each ram pertaining to group $R_3$ operates preferably synchronously within the group but separately from the rams of groups $R_1$ and $R_2$ since the respective pipes 22a, 22b are interconnected, as explained before.

For the cylinders 28a of rams 28, separate feed and discharge pipes 24a, 24b are provided (see FIGS. 1, 3 and 4) so as to allow this group of, say, four rams to be controlled separately and with greater power. The pipe connections and the groups are clearly indicated in FIG. 3; the outlines of the respective groups $R_1$, $R_2$ and $R_3$ are shown with dot-dash frames, the four cylinders 28a being within the group $R_1$ is actually cross-shaped, and includes twelve rams in all (eight rams 18 and four rams 28); $R_2$ and $R_3$ are concentric and include twelve and eight rams 18 respectively, as shown. While this arrangement has been found advantageous, other configurations, numbers and arrangements may also be used within the scope of the invention.

The pressure receiver or end plate 6 can be opened and closed at will by pivoting the aforementioned hinges 13 about a number of intermediate hinges 26 secured to the side wall of the casing 2 (see FIGS. 1 and 2), the two groups of hinges being traversed by a pin 30. An opening and closing means is provided on the opposite side, where the flange 14 is located, and this will now be described in detail.

Figure 2:
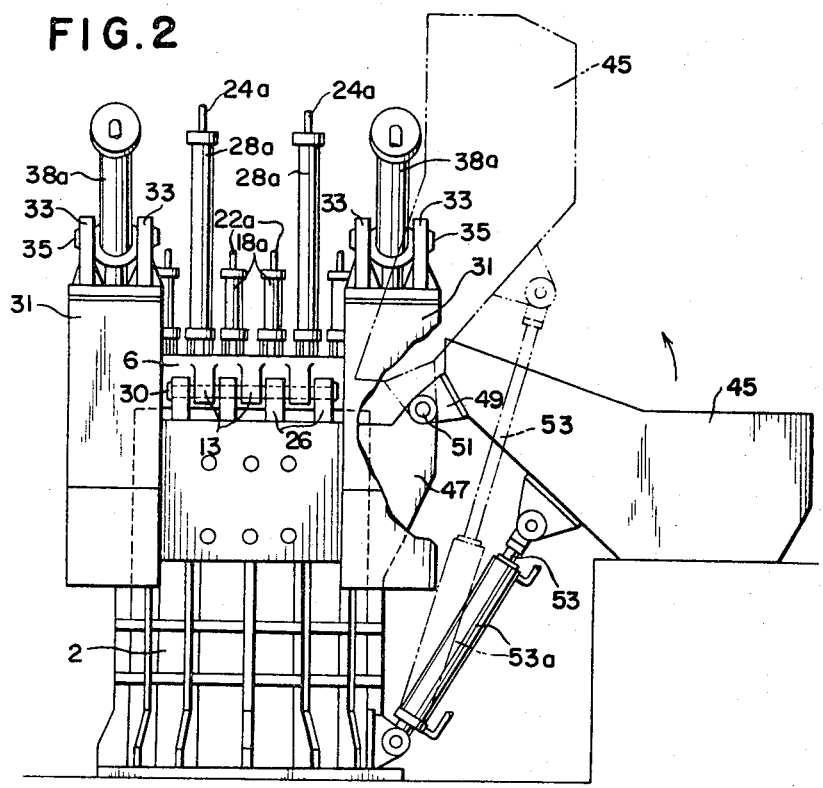
FIG. 2 is a side view of the compressor shown in FIG. 1.

Referring to FIGS. 1 and 2, two L-shaped arms 31 are parallel mounted on the side wall of the casing, on either side of the hinges 26. Each arm 31 has a pair of brackets 33 mounted thereon for carrying a ram 38 and an associated operating cylinder 38a in a manner pivotable about a pivot 35. The front end of each ram 38 is pin-engaged with a side bracket (not shown) of the pressure receiver 6. When pressurized water, oil or other hydraulic fluid is made to enter the cylinder 38a, by way of the actuating system 50, the ram 38 is thereby made to protrude or retract, thereby pivoting the pressure receiver 6 about the pin 30. While the closed position of the receiver is shown in FIG. 1 in solid lines, the opened position (with retracted ram 38) is shown in dot-dash lines, the cylinder 38a being then itself pivoted about the pivot 35.

In FIG. 4, the actuating system 50 is shown to include the valves 56 and change-over switches 58 for the various rams and associated cylinders, such as those (18, 28; 18a, 28a) of the rams, of the drive mechanism (8, 8a), of the operating mechanism (38, 38a) and of the locking means (48, 48a) to be described hereunder in detail.

A locking means is also provided for the pressure receiver 6, as will now be described. The casing 2 has at its upper edge a flange 36 on the side corresponding to the flange 14 of the receiver 6. Underneath the flange 36, the casing carries an arm 40 with a bracket 40a, the latter carrying a hydraulic cylinder 48a for a ram 48. The forward end of the ram has a clamp 42 with a channel which is adapted simultaneously to hold the flanges 36 and 14 when the receiver 6 is closed (as illustrated). The clamp 42 can of course be moved toward and away from the flanges for engaging and disengaging them, respectively. The lower side of clamp 42 has a wheel 42a which can travel along a rail 44 or like element, supported by the top surface of arm 40. This facilitates the movement and operation of the clamp.

FIG. 2 shows how a hopper 45 is disposed on the side of the casing 2 intermediate the sides with the arms 31 and 40. A hinge 47 is attached to the side wall of the casing while the fore end of the hopper 45 has a mating hinge 49, interengaged by a pin 51. The hopper can thus be pivoted or rotated from the solid-line rest position to an elevated, operative position shown in dot-dash lines. To the lower part of the casing side wall, the lower end of a ram and cylinder unit 53, 53a is connected; the upper or fore end is attached to the hopper 45, as shown. Thus, when the ram 53 is actuated, the hopper will be raised and the scrap thrown therein will be eventually discharged into the compression casing 2. The end plate 6 has of course to be open during this procedure.

Now the operation and function of the scrap-metal compressor will be described, starting with the condition of the components as shown in FIGS. 1 and 2. First of all, the collected scraps are dumped into the hopper 45. Pressurized fluid is then introduced from the system 50 into one end of the cylinder 48a to have the clamp 42 recede and unlock the flanges 14, 36; hereafter pressurized fluid is allowed to enter the cylinder 38a to open the pressure receiver 6. Next, cylinder 53a is energized to raise the hopper 45 whereby the scraps are thrown into the casing 2. Hereafter, the hopper is released so as to pivot back to its original or rest position, and the pressure receiver 6 is closed whereafter the clamp 42 is advanced to lock the receiver.

The scrap lumps are piled up above the pressure plate 5. Upon elevation of the plate, by introducing hydraulic fluid into the cylinder 8a, the lumps will be compressed between said plate 5 and the pressure receiver 6 and formed into blocks which will necessarily include both compacted and loose portions. In this condition, cylinders 18a are activated which belong to the group of rams $R_1$, and thus the spot-pressure rams are made to protrude so that concentrated pressure will be applied to certain portions of the partly compacted scrap block. Thereafter, the rams are made to recede, after which the pressure plate 5 is again raised for carrying out another compression.

It will be understood that in the foregoing operational description, it is always FIG. 4 and the actuating system 50 shown therein which is referred to when introducing fluid into or allowing the same to be discharged from the respective cylinders 8a, 18a, 28a, 38a and/or 48a of the inventive scrap-metal compressor.

In succession to the foregoing primary pressure, the secondary and tertiary pressure applications will follow; in other words, while the pressure plate is elevated, pressurized water, oil or other hydraulic fluid is introduced into the cylinders of the ram group $R_2$ so as to make the rams protrude whereby the semi-compressed scrap lumps or block undergo spot pressure at the portions which have not been compressed or compacted before by the rams of group $R_1$. Thus, by means of the secondary spot pressure following the primary pressure, the scrap lumps in the block will mutually shift or get intermixed and intertwined so that there is a tendency of the compacted portions to be interengaged with the loose or coarse portions, thus resulting in a higher homogeneity as a whole. Subsequently the rams of group $R_2$ are allowed to recede, and the compression is again carried out with the pressure plate 5.

Finally the tertiary spot-pressure application follows, making each ram 18 of group $R_3$ to protrude so that the block will now undergo spot pressure at the portions that were not treated before by the rams of groups $R_1$ and $R_2$. Thus the material in the block is even further compacted, intertwined and interengaged, so as to result in a thoroughly compacted and highly uniform scrap-metal block.

Subsequent to the third spot-pressure application, the last activated rams are also made to recede and a finishing compression is applied with plate 5, whereafter the clamp 42 is unlocked and the pressure receiver 6 is opened. The pressure plate can now be elevated further so as to display the completed scrap block outside the casing 2, so that it may be removed by suitable means.

It is possible to carry out the compression without removing the compressed blocks from the casing but successively throwing fresh scraps onto the previously compacted blocks. In this case, when the presure plate 5 is lowered after the above-mentioned finishing compression is applied therewith, the block will remain unchanged and adheres to the pressure receiver 6. Thenceforth, the rams 28 are made to advance in the described manner whereby the block will be pushed by the rams in downward direction and falls down onto the pressure plate 5 which is in the lowermost position, as afore-mentioned. Thereafter, the pressure receiver 6 is opened and the hopper is activated so as to introduce more scraps into the casing; hereafter similar compression phases follow, as described before. Fresh scraps will be thrown in, a proper number of times, after every finishing compression has been applied to the scraps or lumps, and thus the block layers are lapped in succession on the previously formed block or block layers. Thus scraps in optional quantities may be compacted into a single block, within the same compression casing, in a relatively short while. The composite block is then removed from the casing.

With reference to the schematic illustration of FIG. 4 it should be noted that the invention contemplates the provision of the necessary hydraulic pump 54, as shown, or pumps, tank 52 or tanks, solenoid-type valves 56 and 58, and other conventional expedients for the above-mentioned hydraulic cylinders, substantially within the framework of the actuating system generally designated by numeral 50. The change-over valves 58 may be provided, in conjunction with controlling and supervisory devices (not shown), depending upon the degree of automation desired when operating the scrap-metal compressor according to the invention.

Instead of the above-mentioned pressurized-water, oil or other hydraulic-fluid system, other hydraulic or similar systems may be used to the same effect. The cylinders and rams mentioned in the specification should be considered with these possible mechanical and functional equivalents in mind.

It should be noted that one or more hydraulic pumps 54, compressors, or other sources of pressurized fluid may be provided in the actuating system 50 in a conventional manner.

A device may be added to the inventive scrap-metal compressor for removing the compressed blocks from the casing. This modification is not described further herein and is the subject matter of the afore-mentioned copending application Ser. No. 576,916, entitled "Device for Removing Materials from a Compressor." Essentially, the modification includes wheels on the underside of the pressure plate and a track at the level or above the edge of the pressure receiver or end plate, preferably including rails along which the pressure plate may be rolled once it is elevated to the height of the track.

The foregoing disclosure relates only to preferred, exemplary embodiments of the invention, which is intended to include all changes and modifications of the examples described, within the scope of the invention as set forth in the appended claims.

What I claim is:

1. A scrap-metal compressor for forming into blocks of desired shape iron and metal materials to be reprocessed in a furnace in the form of said blocks, comprising an elongated compressor casing for receiving said materials, a pressure plate slidably disposed within said casing, a pressure receiver removably attached to one end of said casing, and a plurality of reciprocable ram means traversing said pressure receiver and energizable for applying a compressive force to said materials in said casing in a direction toward said pressure plate.

2. The scrap-metal compressor as defined in claim 1, wherein said ram means include at least two separately energizable groups of spot-pressure rams.

3. The scrap-metal compressor as defined in claim 2, wherein said groups of rams are substantially concentric with each other.

4. The scrap-metal compressor as defined in claim 1, wherein said ram means include at least one long-stroke ram separately energizable from the remaining ram means.

5. The scrap-metal compressor as defined in claim 1, further comprising hopper means for introducing said materials into said casing.

6. The scrap-metal compressor as defined in claim 5, wherein said hopper means includes a pivotable hopper and drive means operatively connected between said casing and said hopper for moving the same between a lowered rest position for filling and an elevated operative position for emptying.

7. The scrap-metal compressor as defined in claim 1, further, comprising hinged attaching means for said pressure receiver, and releasable locking means for selectively locking and unlocking said pressure receiver.

8. The scrap-metal compressor as defined in claim 7, wherein said locking means is on the side of said casing opposite to that carrying portions of said attaching means, said casing and said pressure receiver have overlying flanged portions, and said locking means includes a reciprocable clamp for engaging both said flanged portions in the locked condition of said pressure receiver.

9. The scrap-metal compressor as defined in claim 7, further comprising operating means for selectively opening and closing said pressure receiver.

10. The scrap-metal compressor as defined in claim 9, wherein said operating means includes at least one reciprocable ram pivoted with respective portions to said pressure receiver and to said casing.

11. The scrap-metal compressor as defined in claim 10, wherein said casing has at least one lateral bracket, one end of said ram is pivoted to said pressure receiver, and an intermediate portion of said ram is pivoted to said bracket.

12. The scrap-metal compressor as defined in claim 9, further comprising drive means operatively connected to said casing at its other end for reciprocating said pressure plate independently from the reciprocation of said ram means.

13. The scrap-metal compressor as defined in claim 12, further comprising oil-pressure actuating means for said ram means, said locking means, said operating means, and said drive means, allowing selective operation thereof independently from each other.

References Cited

UNITED STATES PATENTS

| | | | |
|---|---|---|---|
| 394,527 | 12/1888 | Von Mitzlaff | 100—244 XR |
| 2,221,806 | 11/1940 | Loomis. | |
| 2,341,012 | 2/1944 | Billman et al. | 25—41 |
| 2,855,628 | 10/1958 | Lassman. | |
| 2,934,002 | 4/1960 | Holt | 100—215 XR |

FOREIGN PATENTS 311,408   3/1919   Germany.

BILLY J. WILHITE, *Primary Examiner.*